United States Patent
Leisten

(10) Patent No.: US 8,022,891 B2
(45) Date of Patent: Sep. 20, 2011

(54) RADIO COMMUNICATION SYSTEM

(75) Inventor: Oliver Paul Leisten, Raunds (GB)

(73) Assignee: Sarantel Limited, Wellingborough (GB)

( * ) Notice: Subject to any disclaimer, the term of this patent is extended or adjusted under 35 U.S.C. 154(b) by 647 days.

(21) Appl. No.: 12/002,298

(22) Filed: Dec. 14, 2007

(65) Prior Publication Data

US 2008/0291818 A1  Nov. 27, 2008

Related U.S. Application Data

(60) Provisional application No. 60/921,768, filed on Apr. 3, 2007.

(30) Foreign Application Priority Data

Dec. 14, 2006  (GB) .................................. 0624973.4

(51) Int. Cl.
  *H01Q 1/36*  (2006.01)
  *H01Q 1/50*  (2006.01)
(52) U.S. Cl. ........................................ 343/895; 343/859
(58) Field of Classification Search .................. 343/895, 343/850, 853, 859, 865
  See application file for complete search history.

(56) References Cited

U.S. PATENT DOCUMENTS

| | | | |
|---|---|---|---|
| 3,599,220 A | 8/1971 | Dempsey | |
| 4,008,479 A | 2/1977 | Smith | |
| 4,554,554 A | 11/1985 | Olesen et al. | |
| 4,608,574 A | 8/1986 | Webster et al. | |
| 5,191,340 A * | 3/1993 | Brandao et al. | 342/373 |
| 5,191,352 A | 3/1993 | Branson | |
| 5,346,300 A | 9/1994 | Yamamoto et al. | |
| 5,349,365 A | 9/1994 | Ow et al. | |
| 5,635,945 A | 6/1997 | McConnell et al. | |
| 5,838,282 A | 11/1998 | Lalezari et al. | |
| 5,854,609 A | 12/1998 | Pyo et al. | |
| 5,859,621 A * | 1/1999 | Leisten | 343/895 |
| 5,945,963 A | 8/1999 | Leisten | |
| 5,963,180 A | 10/1999 | Leisten | |
| 6,011,524 A | 1/2000 | Jervis | |
| 6,031,495 A | 2/2000 | Simmons et al. | |
| 6,094,178 A | 7/2000 | Sanford | |
| 6,133,891 A | 10/2000 | Josypenko | |

(Continued)

FOREIGN PATENT DOCUMENTS

CN  2899134 Y  5/2007

(Continued)

OTHER PUBLICATIONS

International Search Report from PCT/GB2007/004750, Apr. 10, 2008.

(Continued)

*Primary Examiner* — Hoang V Nguyen
(74) *Attorney, Agent, or Firm* — John Bruckner PC

(57) ABSTRACT

A radio communication receiver which includes an antenna array having at least two antennas to provide antenna diversity. The receiver is for receiving signals containing orthogonally coded data sub-streams derived from a source data stream. The receiver also has receiver circuitry, coupled to the antenna array, having a detection stage to detect the data sub-streams and a combiner stage for combining the detected data sub-streams to recover the source data stream. Each antenna has an electrically insulative core of solid material having a dielectric constant greater than 5. Each antenna also has a three-dimensional antenna element structure disposed on or adjacent the outer surface of the core.

36 Claims, 6 Drawing Sheets

U.S. PATENT DOCUMENTS

| | | | |
|---|---|---|---|
| 6,150,984 A | 11/2000 | Suguro et al. | |
| 6,229,488 B1 | 5/2001 | Lin et al. | |
| 6,229,499 B1 | 5/2001 | Licul et al. | |
| 6,232,929 B1 | 5/2001 | Ermutlu et al. | |
| 6,300,917 B1 | 10/2001 | Leisten et al. | |
| 6,369,776 B1 | 4/2002 | Leisten et al. | |
| 6,384,798 B1 | 5/2002 | Barta et al. | |
| 6,476,776 B1 | 11/2002 | Kurby | |
| 6,480,173 B1 | 11/2002 | Marino | |
| 6,552,693 B1 | 4/2003 | Leisten | |
| 6,690,336 B1 | 2/2004 | Leisten | |
| 6,765,541 B1 | 7/2004 | Josypenko | |
| 6,821,859 B2 | 11/2004 | Raebiger et al. | |
| 6,886,237 B2 | 5/2005 | Leisten et al. | |
| 6,914,580 B2 | 7/2005 | Leisten | |
| 7,256,752 B2 | 8/2007 | Wither et al. | |
| 2002/0085643 A1 | 7/2002 | Kitchener | |
| 2002/0113731 A1 | 8/2002 | Strickland | |
| 2006/0067119 A1 | 3/2006 | Tempel | |
| 2006/0105730 A1 | 5/2006 | Modonesi | |

FOREIGN PATENT DOCUMENTS

| | | |
|---|---|---|
| EP | 0469741 | 2/1992 |
| EP | 0528175 A | 2/1993 |
| EP | 0791978 | 8/1997 |
| EP | 1076378 | 2/2001 |
| EP | 1306921 A | 5/2003 |
| GB | 587627 A | 5/1947 |
| GB | 2202638 | 9/1988 |
| GB | 2282487 A | 4/1995 |
| GB | 2292257 | 2/1996 |
| GB | 2292638 A | 2/1996 |
| GB | 2310543 A | 8/1997 |
| GB | 2311675 | 10/1997 |
| GB | 2338605 A | 12/1999 |
| GB | 2351850 A | 1/2001 |
| GB | 2367429 A | 4/2002 |
| GB | 2415863 | 1/2006 |
| GB | 2424521 | 9/2006 |
| GB | 2419037 A | 4/2008 |
| GB | 2420230 | 6/2009 |
| JP | 02278901 | 11/1990 |
| JP | 2004040596 | 2/2004 |
| TW | I238566 | 7/1993 |
| TW | M276332 | 2/2005 |
| TW | I248230 | 1/2006 |
| WO | WO 9926316 A | 5/1999 |
| WO | WO 9931820 A | 6/1999 |
| WO | WO 00/39887 | 7/2000 |
| WO | WO0048268 | 8/2000 |
| WO | WO03044895 | 5/2003 |
| WO | WO 03/071633 | 8/2003 |
| WO | WO2006136809 | 12/2006 |
| WO | WO2006136810 | 12/2006 |

OTHER PUBLICATIONS

Written Opinion of the International Searching Authority from PCT/GB2007/004750, Apr. 10, 2008.

International Preliminary Report on Patentability from PCT/GB2007/004750, Mar. 23, 2009.

\* cited by examiner

RADIO COMMUNICATION SYSTEM

CROSS-REFERENCES TO RELATED APPLICATIONS

This application claims a benefit of priority under 35 U.S.C. 119(e) from provisional patent application U.S. Ser. No. 60/921,768, filed Apr. 3, 2007, the entire contents of which are hereby expressly incorporated herein by reference for all purposes. This application is related to, and claims a benefit of priority under one or more of 35 U.S.C. 119(a)-119(d) from copending foreign patent application 0624973.4, filed in the United Kingdom on Dec. 14, 2006 under the Paris Convention, the entire contents of which are hereby expressly incorporated herein by reference for all purposes.

BACKGROUND INFORMATION

1. Field of the Invention

The present invention relates to a radio communication device and, in particular, radio communication devices for use in a multi-channel radio communication system.

2. Discussion of the Related Art

In the field of radio communications, multiple-input multiple-output (MIMO) systems transmit signals over at least two antennas and receive signals over at least two antennas. A typical MIMO communication system is shown in FIG. 1, which is described in more detail below. A data stream is split into a number of independent sub-streams and each sub-stream is transmitted over a different antenna using the same frequency band. Each signal is coded to be statistically independent from the other signals. At the receiver, each antenna receives the signals transmitted by all of the transmit antennas, as well as any multipath signals arising in the local environment. The received signals are processed to isolate individual data sub-streams, to the maximum extent possible according to channel conditions, which are then recombined to recreate the original datastream.

The separate transmit signals may be coded to be statistically independent using orthogonal frequency division multiple access (OFDMA) techniques or code division multiple access (CDMA) techniques. Coding ensures low correlation between signals.

The throughput of a MIMO system promises to be much greater than an equivalent SISO (single-input single-output) system. This additional throughput can potentially come with no increase in bandwidth or overall transmit power. MIMO systems work best in environments in which there is a large amount of scattering, such as environments which can be modelled with independent Rayleigh fading. Scattering of this nature functions as a spatial multiplexer, which spatially decorrelates the signals. In such environments, the receive antennas receive independent linear combinations of the signals transmitted along many paths. It follows that outputs of the receive antennas are linear combinations of the transmitted signals which can distinguished from each other.

In a conventional MIMO system, coupling between receive antennas occurs according to two mechanisms. Firstly, each receive antenna receives signals from the transmitter which induce currents in the conductive structure of the antenna. The induced currents generate their own electromagnetic fields which re-radiate corresponding signals. These re-radiated signals are received by adjacent antennas. Secondly, in a typical system, signals generated by the antennas result in currents in a receiver ground plane and these currents are shared by adjacent antennas. For example, with a monopole quarterwave ($\lambda/4$) antenna over a ground plane, currents in the ground plane mimic an equivalent quarterwave dipole below the ground plane. By whichever mechanism coupling occurs between receive antennas, it is a serious problem as it causes an increase in the correlation between the signals fed from the receive antennas to receiver circuitry coupled to the antennas. These effects are particularly severe when the receive antennas are close together.

SUMMARY OF THE INVENTION

A MIMO channel can be modelled by a channel matrix [H] which can be visualised as a matrix of antenna-to-antenna impulse responses, or a temporal channel matrix. The channel matrix has a plurality of terms, e.g. $h_{11}$ each representing one of the individual sub-channels which are created between respective antennas. FIG. 1 shows a typical MIMO channel. The transmit side has three transmit antennas and the receive side has three receive antennas. $h_{11}$, $h_{21}$ and $h_{31}$ are vectors which represents the sub-channels between respective transmit and receive antennas. Other vectors are not shown for clarity. The channel matrix can be written as follows:

$$[H] = \begin{bmatrix} h_{11} & h_{12} & h_{13} \\ h_{21} & h_{22} & h_{23} \\ h_{31} & h_{32} & h_{33} \end{bmatrix}$$

If the signals transmitted by the respective transmit antennas are represented by $x_1$, $x_2$, and $x_3$, then the signal $y_1$ received by receive antenna 7a can be expressed as $h_{11}x_1 + h_{12}x_2 + h_{13}x_3$. This model does not account for any reradiation of received signals between receive antennas.

The information capacity of a SISO channel (in binary bits per second) can be determined using the Shannon-Hartley Law which states:

$$C = B \cdot \log_2(1+\rho) \text{ b/s} \qquad (1)$$

where: B is the bandwidth of the channel; and $\rho$ is the signal-to-noise ratio.

The theoretical limit of the capacity of a channel, according to the Shannon-Hartley Law, is determined by the signal-to-noise ratio for the detection of a coded signal having a given bit error rate. It follows from this that in the presence of noise, information can be transmitted over a channel at a rate less than the theoretical capacity of the channel.

It can be shown that the capacity (in bits per second per unit frequency) of a MIMO channel having m receive antennas and n transmit antennas is:

$$C = \log_2 \det[[I_m] + (\rho/n)[H][H]^{tc}] \text{ b/s/Hz} \qquad (2)$$

where:

$I_m$ is the identity matrix; and $[H]^{tc}$ is the complex conjugate transpose of [H]

It can also be shown that the multiple $[H][H]^{tc}$ is equal to the normalised magnitude squared correlation matrix [R]. Thus, the capacity of the MIMO channel can also be written as:

$$C = \log_2 \det[[I_m] + (\rho/n)[R]] \text{ b/s/Hz} \qquad (3)$$

The correlation matrix for the 3×3 case can be written as follows:

$$[R] = \begin{bmatrix} r_{11} & r_{12} & r_{13} \\ r_{21} & r_{22} & r_{23} \\ r_{31} & r_{32} & r_{33} \end{bmatrix}$$

where: $r_{12}$ is the correlation of between signals fed from the receive antennas 7a and 7b, for example.

In the case of a MIMO system in which the channels are statistically orthogonal and parallel, [R] can be shown to be similar to the identity matrix. Equation (2) therefore reduces to:

$$C = n \log_2[1+(\rho/n)] \text{ b/s/Hz (when } n=m\text{)} \tag{4}$$

Thus, with ideal channel conditions, the capacity increases linearly with respect to the number n of transmit and receive antennas.

However, as noted above, coupling between antennas causes correlation between the signals fed from each receive antenna. This can be modelled by considering a MIMO system in which the correlation between signals received by each antenna is the same. This can be represented by a uniform correlation coefficient r. With certain other simplifying assumptions, the capacity expression can be approximated as:

$$C \approx n \log_2(1+(\rho/n)(1-r)) \text{ b/s/Hz (when } n=m\text{)} \tag{5}$$

This equation shows that when $r \to 0$ (no correlation), the capacity of a MIMO system converges to the ideal case (equation (4)) in which the capacity is a linear multiple of the number of transmit and receive antennas. However, when correlation is present, $1 > r > 0$, the effect of correlation is similar to a reduction in the signal-to-noise ratio. For example, a correlation coefficient r=0.5 is equivalent to a 3 dB reduction in signal-to-noise ratio. A consequence of this is that correlation causes the system to suffer co-channel interference from other data sub-streams.

These equations demonstrate how coupling between antennas reduces the capacity of the MIMO channel.

One solution is to ensure the antennas of any given MIMO array have a large spatial distribution, placing each antenna outside the reach of the electromagnetic fields of other antennas, thereby reducing correlation between signals on neighbouring antennas in the receive array. However, this is not always possible. In small devices, for instance, the separation of the antennas is limited by the size of the device. Furthermore, as noted above coupling can occur across the ground plane.

Polarisation and pattern diversity are achieved by using receive antennas with differently oriented radiation patterns which are sensitive to differently polarised signals. Theoretically, polarisation diversity results in high statistically independence between signals generated by adjacent antennas. However, in practice, when antennas are placed close together to the extent that their near-field regions overlap, the radiation patterns combine, and polarisation and pattern diversity is significantly reduced. The statistical independence between signals fed from adjacent antennas is therefore also reduced.

In the textbook *Space-Time Processing of MIMO Communications* (A. B. Gersham and N. D. Sidroponlos; 2005; Wiley) at pages 28 to 31, it is noted that mutual coupling between closely spaced antenna elements can impact on communication performance. The effect of mutual coupling is evaluated by considering the correlation between signals fed from each receive antenna in a MIMO system. The correlation between signals is then used to determine system capacity. A MIMO network model, similar to that shown in FIG. 4, is used for this analysis. The model includes transmit and receive antenna arrays, a MIMO propagation channel, a matching network, receive amplifiers and loads. The flow of signals through the network model is described using scattering parameters (s-parameters). The s-parameters of the matching network are selected to the complex conjugate transpose of the s-parameters of the receive antenna array.

It is an object of the present invention to improve signal reception in a radio communication device having a plurality of antennas.

According to one aspect of the invention, a radio communication receiver device for operation at one or more frequencies in excess of 200 MHz for receiving a plurality of signals containing orthogonally coded data sub-streams derived from a source having at least two antennas to provide diversity, and, coupled to the antenna array, receiver circuitry having a detection stage arranged to detect the data substreams and a combiner stage for combining the detected data sub-streams to recover the source data stream, and wherein each of the antennas comprises: an electrically insulative core of solid material having a relative dielectric constant greater than 5, and a three-dimensional antenna element structure disposed on or adjacent the outer surface of the core and defining an interior volume, the material of the core occupying the major part of the said interior volume.

With such an antenna, the electromagnetic near-field can be concentrated within the dielectric core of the antenna. This results in a significant reduction in the extent and strength of the near-field adjacent such an antenna when compared with, for example, the near-field associated with a monopole antenna. It is possible, therefore, for a given antenna spacing, significantly to reduce the coupling between adjacent antennas and, therefore, to reduce the correlation between signals obtained from the antennas.

Preferably, the detection stage includes a compensating network configured largely to cancel correlation existing between signals fed to the detection stage from the antenna array caused by interaction between the antennas of the array.

The compensating network is preferably configured so that S-parameters of the circuitry downstream of the antennas are the complex conjugate transpose of the S-parameters (representing matching and coupling) of the antenna array.

Preferably, each of the antennas is configured such that, at an operational frequency of each antenna, each antenna has at least one first maximum in its radiation pattern, with respect to a signal received at that frequency and polarised along a first axis. At an operational frequency of each antenna, each antenna has at least one second maximum in its radiation pattern with respect to a signal received at that frequency and polarised along a second axis.

The first maximum may lie substantially in a first plane and the said second maximum substantially in a second plane, the first plane being orthogonal to the second plane. Each of said antennas may be oriented within the device such that its associated first plane, is orthogonal to a first plane of an adjacent antenna. This provides polarisation diversity and takes advantage of the polarisation scattering caused by a typical multipath environment. Such an arrangement also contributes to maintaining signal strength with different orientations of a portable terminal in accordance with the invention.

Preferably, each antenna is configured such that, at an operational frequency of the antennas, with respect to a signal received at that frequency, each antenna has a null in its radiation pattern. The device may then be arranged such that at least one of the antennas is oriented to direct its null towards another of the receive antennas. This also reduces coupling between the antennas, i.e. by configuring the antennas to have nulls in the radiation patterns at the operating frequencies of the antennas and orientating them appropriately. The near-field is, therefore, reduced in the direction of other antennas thereby reducing coupling between the antennas.

Preferably, all of the antennas are oriented such that a null of each antenna is directed towards an adjacent antenna of the array of antennas.

Preferably, the device arranged for use with received signals having operational frequencies of 2.65 GHz, 3.5 GHz or 5 GHz. At these frequencies, the antennas are separated from each other, at their closest points, by a distance of 0.043 m, 0.0325 m and 0.0228 m respectively.

Preferably, the antennas each have a central axis. Antennas having differently orientated radiation patterns may be positioned much closer to each other. In particular they may be positioned with their axes spaced apart by less than $0.38\lambda$ being the wavelength in air of waves at the operating frequency. This figure is obtained from Jakes' model (see, e.g. Liang and Chin: "Downlink channel covariance matrix (DCCM) estimation..." *IEEE J. Sel. Area Commun.*, vol. 19, no. 2, pages 222-232, February 2001).

If the array contains at least three antennas, at least two of which have radiation patterns of the same orientation, the axis of each of the antennas having the same orientation is advantageously spaced from the axis of the nearest other such antenna by a distance of at least $0.38\lambda$, adjacent antennas having differently oriented radiation patterns having their axes spaced apart by less than $0.910\lambda$.

There may be an isolating trap associated with each antenna so that it is isolated from the ground plane of the radio communication device. This arrangement minimises any direct coupling between the antennas through the ground plane. This reduces correlation between signals from neighbouring antennas. Generally, the trap is in the form of a balun, located between the antenna element structure of the antenna and the radio-frequency (RF) circuitry of the radio communication device to which it is coupled. In the case of the antenna having a plurality of elongate antenna conductors coupled to a feed structure and forming part of a loop, the trap may comprise a link conductor. This link conductor may be a conductive sleeve encircling the core on a proximal part of the outer surface of the core, the proximal end of the sleeve being connected to an outer screen part of the feeder structure, the latter passing through the core from a connection to the antenna elements at a distal end of the core, to a proximate end of the core. An effect of the sleeve is that, at the operating frequency of the antenna, a rim of the sleeve is effectively isolated from the ground represented by the outer conductor of the feeder structure at the proximal end. The sleeve therefore acts as an isolating trap in the manner described in GB-A-2292638 and GB-A-2309592, the contents of which are hereby incorporated by reference.

Preferably, the core of each antenna is cylindrical and defines a central axis. Each antenna comprises an antenna element structure having a number of antenna elements which are substantially co-extensive in the axial direction and each element extending between axially spaced-apart positions on or adjacent the outer surface of the core. The antenna element structure also includes comprises a link conductor, linking portions of the antenna elements at one of the spaced-apart positions to form a loop. Portions of the antenna elements at the other of the spaced-apart positions are coupled to a balanced feed connection of the antenna at the distal end of the core.

Furthermore, the respective spaced-apart portions of the antenna elements preferably lie substantially in a single plane containing the central axis of the core as described in the above-mentioned GB-A-2309592. The antenna elements of each antenna are of equal length and are helical, each executing a half-turn around the core between said spaced-apart positions. Each antenna of the array includes an integral trap arranged to promote a substantially balanced condition at the feed connection of the antenna, e.g. as described above.

Preferably, the device further comprises a connector and an interface, together suitable for interfacing the device with a computer. The device may be a Universal Serial Bus device or a PCMCIA card.

Preferably, the device is adapted to receive differently coded sub-streams which are statistically independent of each other. Preferably, the device is a MIMO communication device. Preferably, the device is arranged for use with sub-streams which have been modulated using orthogonal frequency division multiplexing or using orthogonal spreading codes.

Preferably, the device is configured as a transceiver and the antennas are each configured for data stream transmission.

Preferably, the device is configured as a transceiver and wherein at least two of said antennas are configured for transmission and at least two are configured for reception of signals.

In another aspect, the present invention provides a radio communication device, for use at frequencies greater than 200 MHz in multi-channel radio communication networks, the device comprising at least two transmit antennas and a signal processor arranged to split a single data stream into a number of data sub-streams corresponding to the number of transmit antennas, and an encoding stage arranged to feed each data sub-stream to a respective one of the antennas, the set of data sub-streams being orthogonally coded, wherein each of the transmit antennas comprises: an electrically insulative core of solid material having a relative dielectric constant greater than 5, and a three-dimensional antenna element structure disposed on or adjacent the outer surface of the core and defining an interior volume, the material of the core occupying the major part of the said interior volume.

In a further aspect, the present invention provides a multi-channel radio communication system, comprising a plurality of radio communication devices configured to communicate with each other, wherein each device has at least two antennas arranged for either reception or transmission of signals and each antenna has an electrically insulative core of solid material having a relative dielectric constant greater than 5, and a three-dimensional antenna element structure disposed on or adjacent the outer surface of the core and defining an interior volume, the material of the core occupying the major part of the said interior volume.

BRIEF DESCRIPTION OF THE DRAWINGS

The invention will now be described by way of example with reference to the drawings, in which.

DESCRIPTION OF PREFERRED EMBODIMENTS

Figure 1:
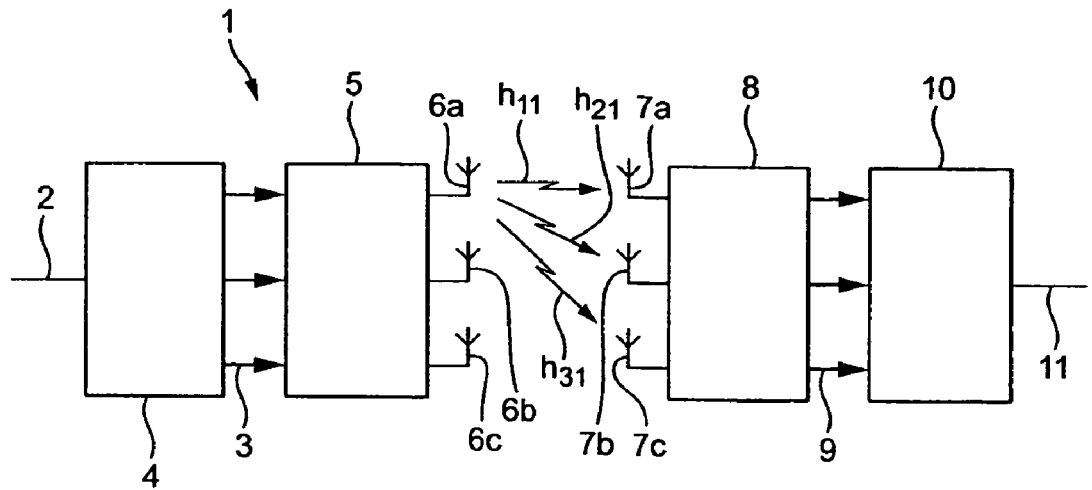
FIG. 1 is a schematic diagram of a MIMO system known from the prior art.

Referring to FIG. 1, in a MIMO radio communications system 1 a data stream 2 is split at the transmit end into a number of orthogonally coded sub-streams 3 by transmitter signal processor 4. The sub-streams are then transmitted by a transmitter 5 via respective transmit antennas 6*a*, 6*b* and 6*c*. At the receive end, each receive antenna 7*a*, 7*b* and 7*c* receives all of the signals transmitted by the transmit antennas. In addition, each receive antenna receives any reflected versions of the individual sub-streams, caused by objects in the environment such as buildings. The receive antennas are coupled to a receiver 8, from which received sub-streams 9 are passed to a receiver signal processor 10. The receiver signal processor combines the received sub-streams to produce reconstituted data stream 11. This includes a data multiplexing process. The MIMO channel that exists in a given scattering environment, may be represented by the channel matrix [H]. This matrix is characterised by transmitting orthogonal training sequences from the transmitter, in a known manner.

Figure 2:
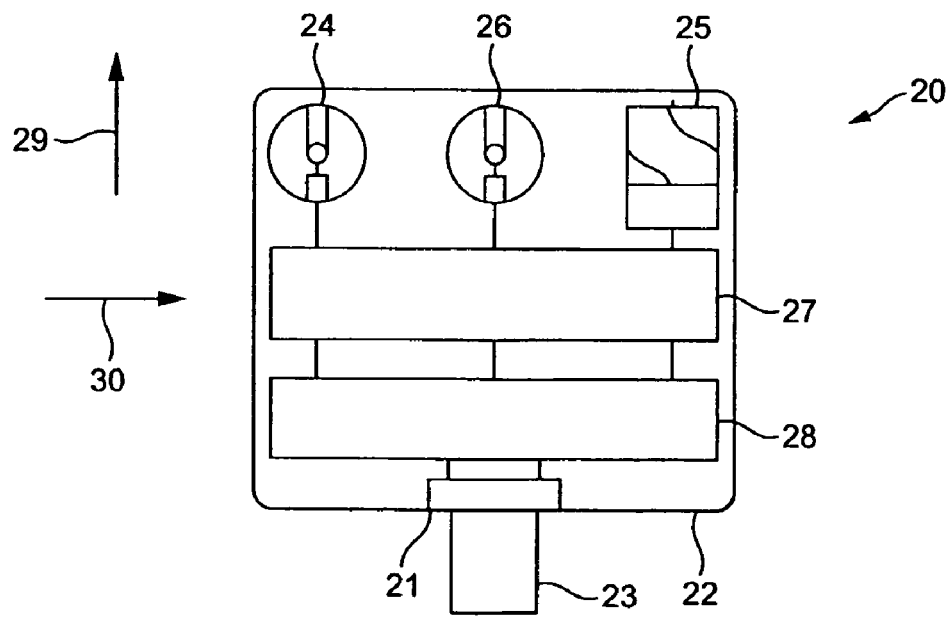
FIG. 2 is a diagram of a first radio communication device in accordance with the present invention.

A radio communication device 20 in accordance with the invention, that may be used in the system of FIG. 1, is shown in FIG. 2. Referring to FIG. 2, this device 20 has a USB (Universal Serial Bus) interface 21 suitable for connection to a personal computer or the like. The components of the device 20 are housed within a casing 22. The USB interface includes a USB connector 23 which is located along one side edge of the casing 22. The device 20 includes two receive antennas 24, 25 and one transmit antenna 26. The antennas are coupled to transmitter/receiver 27 which is coupled to signal processor 28. The signal processor 28 is coupled to the USB interface 21. The antennas are all dielectrically loaded antennas as described in more detail below with reference to FIG. 4. The radio communication device 20 is suitable for MIMO communication for received signals, as it comprises two receive antennas. It is not capable for transmitting signals on a MIMO basis, as it comprises only a single transmit antenna.

Figure 3:
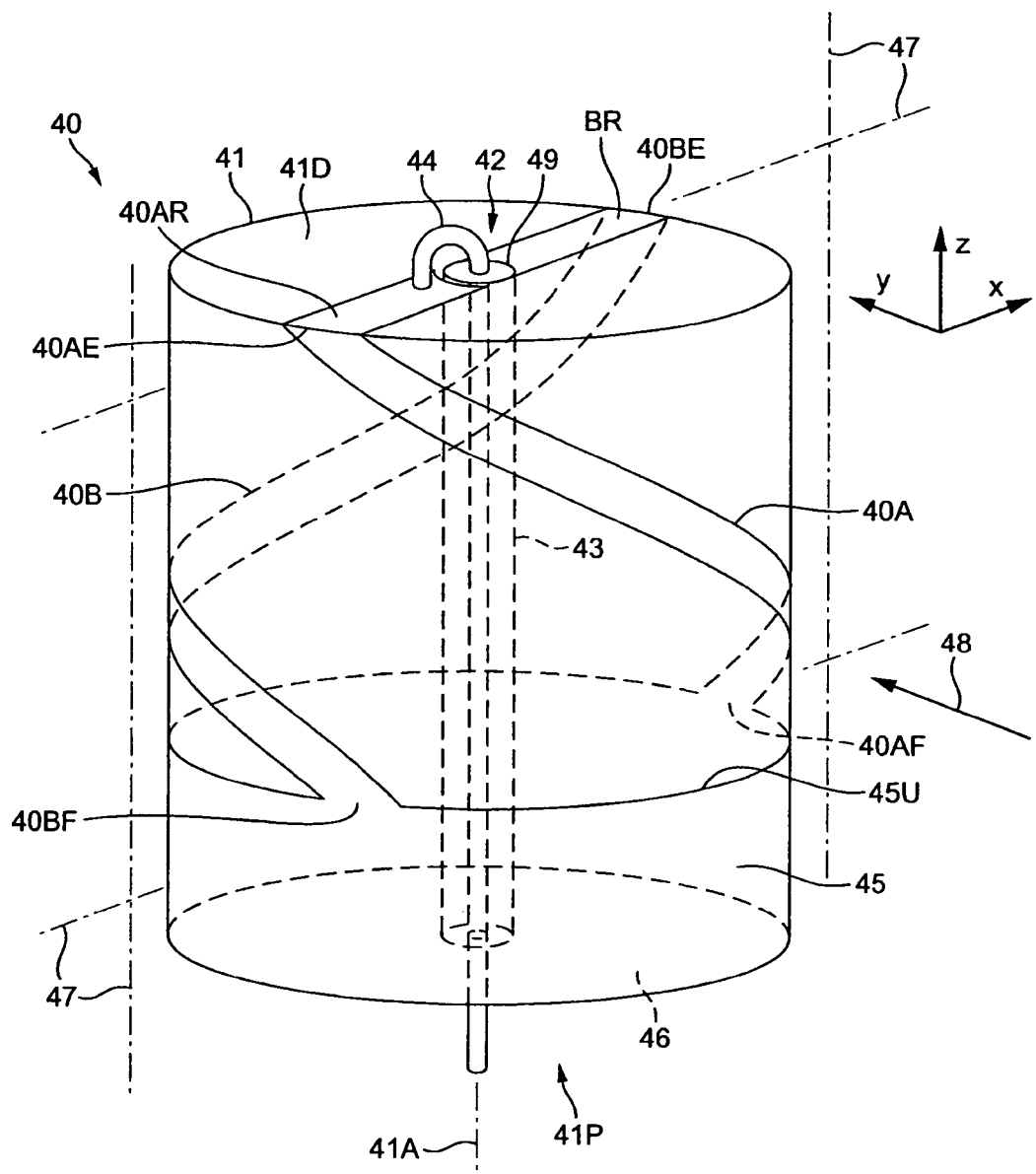
FIG. 3 is a perspective view of a dielectric-loaded antenna suitable for use with the device shown in FIG. 2.

Referring to FIG. 3, an antenna 40 for use in the radio communication device shown in FIG. 2 has an antenna element structure with two longitudinally extending helical antenna elements 40A, 40B formed as metallic conductor tracks on the cylindrical outer surface of a ceramic core 41. The core 41 has an axial passage 42 which houses a coaxial feed structure. The coaxial feed structure comprises a metallic outer 43 and an axial inner feeder conductor 44. The inner conductor 44 and the outer 43 in this case form a feeder structure for coupling a feed line to the antenna elements 40A, 40B at a feed position on the distal end face 41D of the core. The antenna element structure also includes corresponding radial antenna elements 40AR, 40BR formed as metallic tracks on the distal end face 41D connecting diametrically opposed ends 40AE, 40BE of the respective longitudinally extending elements 40A, 40D to the feeder structure. The other ends 40AF, 40BF of the antenna elements 40A, 40B are also diametrically opposed and are linked by an annular common virtual ground conductor 45 in the form of a plated sleeve surrounding a proximal end portion of the core 41. This sleeve 45 is in turn connected to the lining 43 of the axial passage 42 by plating 46 on the proximal end face 41P of the core 41.

Preferably, the conductive sleeve 45 covers a proximal portion of the antenna core 41, thereby surrounding the feeder structure 43, 44, the material of the core 41 filling the whole of the space between the sleeve 45 and the metallic lining 43 of the axial passage 42. The sleeve 45 forms a cylinder connected to the lining 43 by the plating 46 of the proximal end face 41P of the core 41, the combination of the sleeve 45 and plating 46 forming a balun so that signals in the transmission line formed by the feeder structure 43, 44 are converted between an unbalanced state at the proximal end of the antenna and a balanced state at an axial position approximately in the plane of the upper edge 45U of the sleeve 45.

Further preferred features of this antenna can be found in GB 2309592A. Antennas with similar structures and characteristics are described in WO 00/74173A1 and GB 2399948A.

The dielectrically-loaded antennas described above concentrate the electric near-field within the dielectric material of the core. When the antennas receive signals, the voltages induced in the antenna elements produce a very small electric field around the antenna. Referring again to FIG. 2, the field is small enough that the adjacent receive antenna, (which is antenna 24 or 25) is not significantly excited by the other antenna's electric field. Coupling between the antennas is therefore greatly reduced when compared with a conventional monopole antenna. This ensures that correlation between signals fed from by each receive antenna is significantly reduced.

As noted above, the antenna 40 has a sleeve 45 which functions as a balun. A further effect of the sleeve 45 is that for signals in the region of the operating frequency of the antennas, the rim 45U of the sleeve 45 is effectively isolated from the ground represented by the outer conductor 43 of the feeder structure. This means that currents circulating between the antenna elements 40A, 40B are confined to the rim 45U and the loop formed by the helical antenna elements and the rim is, therefore, isolated. Therefore, the sleeve 45 thus acts as an isolating trap. Referring to FIG. 2, the receive antennas 24, 25 are both isolated from the ground plane of device 20. This means that when signals are received by the receive antennas 24, 25, no currents flow between the two antennas, and therefore the antennas are not conductively coupled via the ground plane of the device. This reduces correlation between signals generated by each receive antenna.

Another benefit of this is that the casing 22 in which the antennas are placed does not form part of the radiating (in this case receiving) structure. This is because the radiating elements of each antenna are isolated from the ground plane and therefore they are also isolated from the casing. This means that when a user handles the casing, the degree of coupling between the antennas does not vary substantially. In contrast, conventional monopole antennas are not isolated from the casing. The casing therefore acts as part of the radiating structure according to two mechanisms. Firstly, any reflections from the casing are radiated towards the antennas. Secondly, the casing directly drives the antenna element via coupling through the receiver ground plane. If the user handles the box the degree of coupling between the antennas varies.

This feature of the device 20 brings a significant advantage. That is that the coupling between the receive antennas is relatively static. The correlation matrix [R] therefore represents the coupling between the receive antennas. The effect of coupling can then be removed using an array combining network. An array combining network can be used to apply reverse power flows to the signals fed from by the antennas to remove the parts of the signals fed from each antenna which represent coupling between the antennas.

Figure 4:
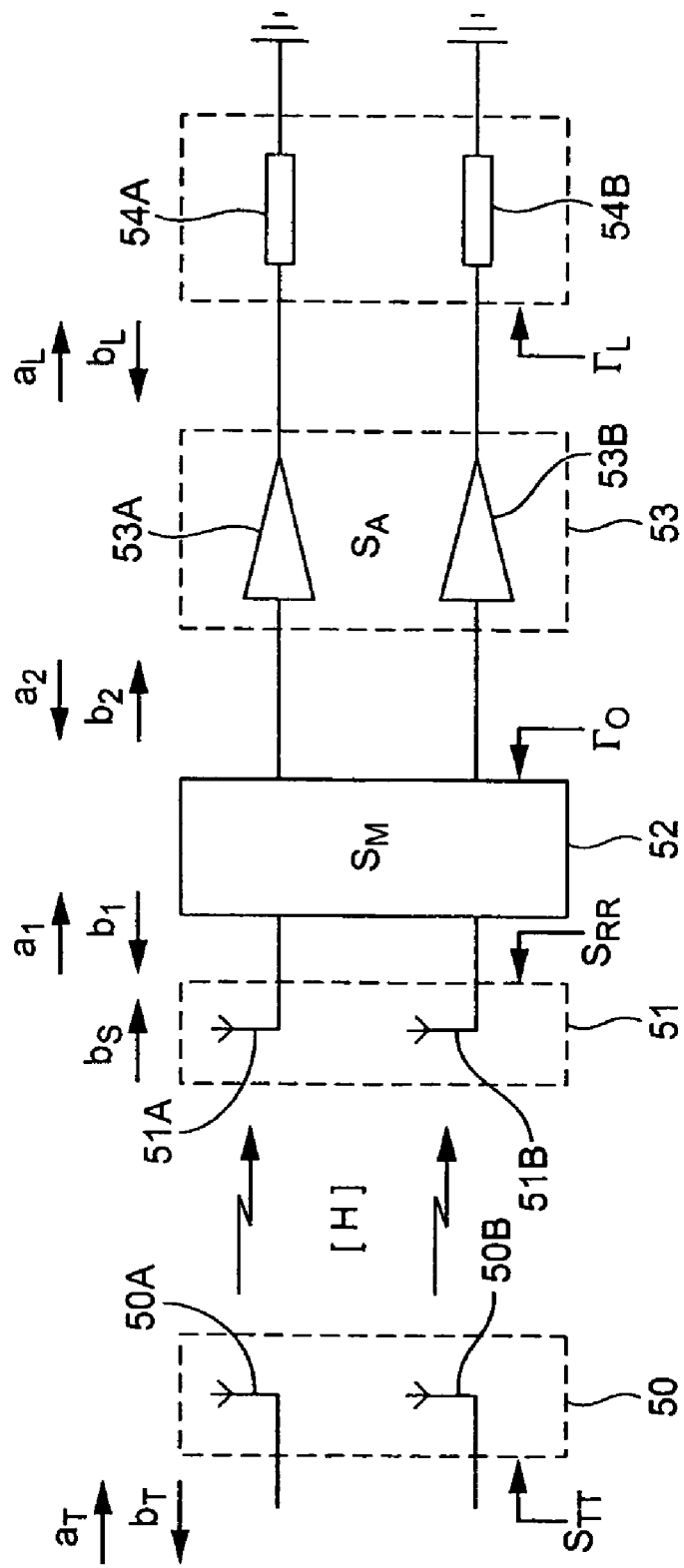
FIG. 4 is a schematic diagram of a part of a MIMO communication system incorporating the radio communication device of FIG. 2.

Referring to FIG. 4, in a MIMO communication system, a transmitting antenna array 50 transmits signals via channel [H] to receiving antenna array 51. The transmitting antenna array 50 comprises two transmit antennas 50A, 50B. The receiving array 51 comprises two receive antennas 51A, 51B, which correspond to antennas 24 and 25. Both receive antennas 51A, 51B are coupled to a matching and combining network 52 which is coupled to an amplifier array 53. The amplifier array 53 comprises two amplifiers 53A, 53B each corresponding to a respective one of the receive antennas 51A, 51B. Each amplifier is coupled to a respective load 54A, 54B.

In FIG. 4, the loads 54A, 54B represent all circuitry downstream of amplifiers 53A, 53B. The load voltage vectors are expressed in terms of the reflection from the amplifier array ($a_2$ in FIG. 4). This reflected component is significant and may well be the highest reflection coefficient in the system. It cannot simply be considered as noise (as has been the case in the prior art). The S-parameters of the whole of the network downstream from the receive antenna array 51 (to the right of the antenna array 51 in FIG. 4) must be selected to be equal to the complex conjugate transpose of the S-parameters of the receive antennas, respectively coupling between the antennas.

The matching and combining network 52 provides the function of impedance matching together with that of removing the effect of coupling. Matching and coupling are related in that, for example, coupling between receive antennas affects the match. Both functions are performed by setting the s-parameters of the matching and combining network 52 to be the complex conjugate transpose of the s-parameters of the receive antenna array.

One technique for deriving the required s-parameters for the matching and combining network 52 makes use of a network analyser. The network analyser is connected to the assembly of the receive antenna and the associated feed conductors coupling them to the network 52. A test signal is fed to one antenna via its feed conductor and both a reflected signal and signals generated on the feed conductors of the other antennas are measured. The same is done with the test signal fed to another of the antennas and so on for each antenna. The results are then used to populate an n×n s-parameter matrix which represents the antenna array (n being the number of receive antennas), from which the complex conjugate transpose s-parameter matrix is computed for the matching and combining network.

Figure 5:
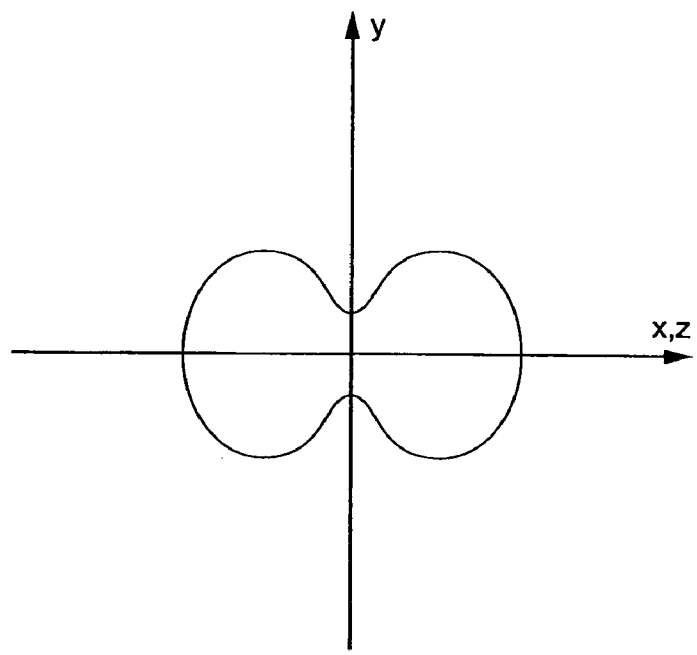
FIG. 5 is a diagram illustrating the radiation pattern of the antenna of FIG. 3.

Referring now to the antennas themselves, one of which is shown in FIG. 3, the antenna element structure of each antenna, has half-turn helical elements 40A, 40B which operate such that the antenna has transverse nulls in its radiation pattern. The nulls are directed transversely to the axis 41A and perpendicularly to the plane 47. The radiation pattern is, therefore, approximately of a figure-of-eight form in both the vertical and horizontal planes transverse to the axis 41A, as shown by FIG. 5. Orientation of the radiation pattern with respect to the perspective view of FIG. 3 is shown by the axis system comprising axes X, Y, Z shown in both FIG. 3 and FIG. 5. The radiation pattern has two nulls or notches, one on each side of the antenna, and each centred on the line 48 shown in FIG. 3.

Figure 6:
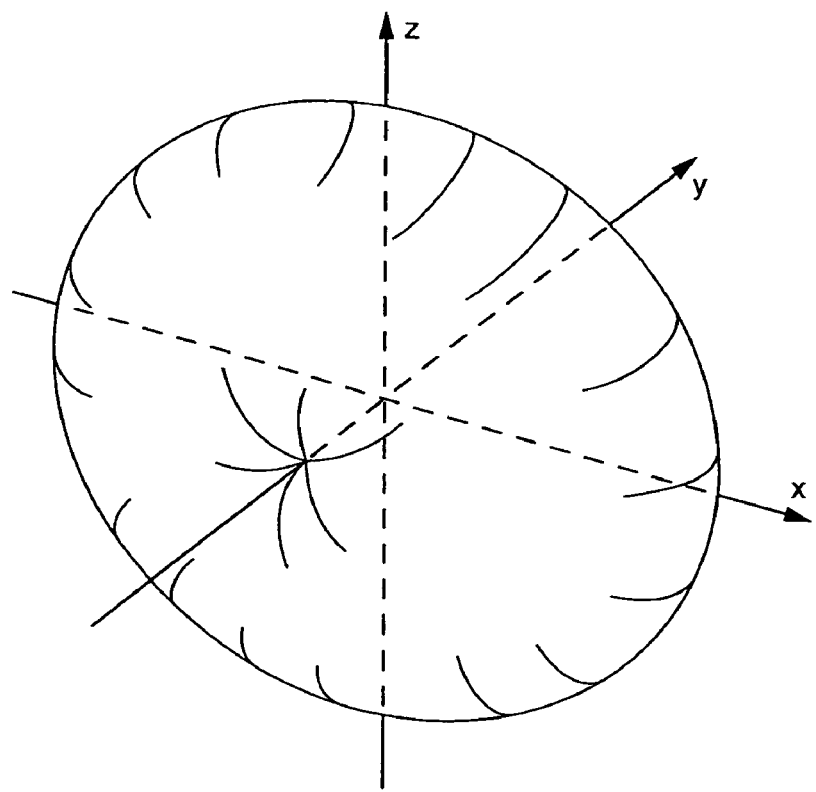
FIG. 6 is a diagram illustrating the radiation pattern, in three-dimensions, of the antenna of FIG. 3.

By selecting the orientation of the antennas in an array, their radiation patterns can be used to provide polarisation diversity Firstly, the radiation pattern should be considered in more detail:

FIG. 6 is a three-dimensional representation of the radiation pattern shown in FIG. 5, for all polarisation modes combined. The radiation pattern has a null in the y-direction, which corresponds to the arrow 48 in FIG. 3. A corresponding null exists in the opposite direction along the y-axis.

Figure 7:
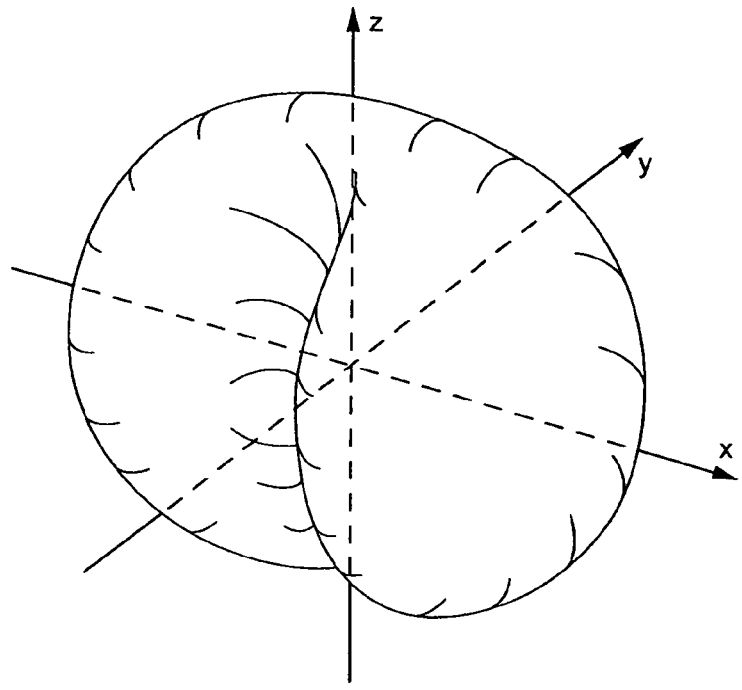
FIG. 7 is a diagram illustrating the radiation pattern of the antenna of FIG. 3, in three-dimensions, for vertically polarised signals.

FIG. 7 shows a three-dimensional radiation pattern for the antenna shown in FIG. 3 for vertically polarised signals only. As can be seen in FIG. 7, the antenna is substantially omni-directional in the xz plane and a null extends outwardly from the y axis in the yz plane.

Figure 8:
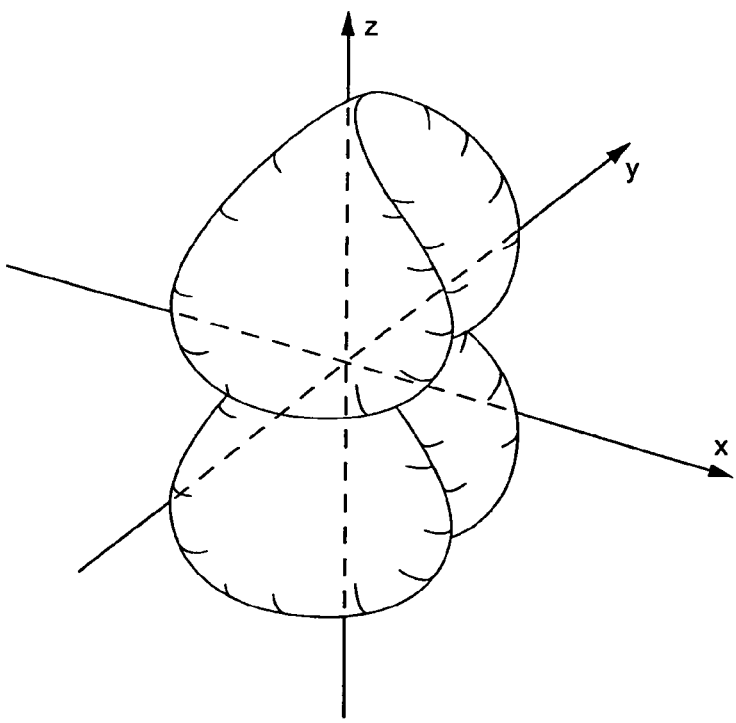
FIG. 8 is a diagram illustrating the radiation pattern, in three-dimensions, representing horizontally polarised signals of the antenna of FIG. 3.

Now looking, instead a the pattern for horizontally polarised waves, FIG. 8 indicates maxima in each quadrant of yz plane, but they do not extend to the y axis itself. Maxima exist along the z axis but do not extend outwardly from the z axis along the zx plane.

Referring again to FIG. 2, receive antenna 24 is oriented within the radio communications device 20 such that its x-axis has a first direction as indicated by arrow 29, and its y-axis has a second direction as indicated by arrow 30. As can be seen in FIG. 6, the nulls of antenna 24 are directed along its y-axis. Accordingly, one of the nulls in the radiation pattern of antenna 24 is directed in the second direction, i.e. in the direction of receive antenna 25. Furthermore, maxima in the radiation pattern representing vertical polarisation are directed parallel to arrow 29 while maxima in the radiation pattern representing horizontal polarisation are not. This can be seen from FIGS. 7 and 8. In this way, coupling between the antennas is reduced.

Antenna 25 is oriented within the radio communication device 20 such that its z-axis is parallel to arrow 29 and its y-axis is parallel to arrow 30. Thus, a null in the radiation pattern of antenna 25 is directed parallel to arrow 30 and in the direction of receive antenna 24. Furthermore, the maxima in the radiation pattern representing horizontal polarisation are directed generally parallel to arrow 29.

This arrangement provides polarisation and pattern diversity. As described above, antennas 24 and 25 are oriented so that antenna 24 is better suited to receive vertically polarised signals received in the direction parallel to arrow 29, and antenna 25 is better suited to receive horizontally polarised signals received in that direction. In a MIMO system incorporating the device 20, two transmit antennas can be used, each being oriented such that it transmits signals with a polarisation corresponding to the polarisation of one of the receive antennas 24, 25.

Polarisation diversity is of particular benefit when antennas as described above are used because coupling is reduced between antennas arranged to receive differently polarised waves. As noted above, the dielectrically-loaded antenna described with reference to FIG. 3 has a small near-field outreach because most of the near-field energy is stored in the dielectric core of the antenna. This allows the antennas to be placed closer together when compared with conventional antennas. In practice, the minimum separation between receive antennas will depend on the dielectric constant of the core of the antennas and can be optimised dependent on the size of the intended casing 22.

The use of polarisation diversity, achieved by selecting the orientation of the antennas as described above, allows adjacent receive antennas to be placed with a separation of less than 0.38λ while maintaining spatial diversity. Since the extent of the near-field is less than with other types of antenna, the near-field regions of adjacent antennas do not overlap and the radiation patterns do not combine substantially to destroy the individual patterns. An optimum arrangement has three receive antennas oriented such that their pattern maxima are aligned with one of the x, y or z axes respectively. These antennas can be placed in line within a space of 0.38λ in length.

A further aspect of this arrangement is that the nulls in the radiation patterns of antennas 24 and 25 are directed towards each other. As a result, there is less reradiation of received signals in the direction of the receive antennas 24, 25, than in other directions, and consequently coupling between the antennas is further reduced.

It can be shown that correlation between signals received from the transmitter and signals received by reradiation from adjacent antennas that have identical radiation patterns can be substantially reduced if the adjacent antennas are spaced by at least 0.38λ at their nearest points, where λ is the wavelength in air at the centre frequency of the wanted signal. In a radio communication device comprising antennas with identical radiation patterns and adapted for use at a frequency of 2.65 GHz, 0.38λ. Similarly configured devices may be used with signals centred on other frequencies, e.g. 3.5 GHz and 5 GHz, in which case 0.38λ is 3.25 cm and 2.28 cm respectively. However, separating devices by this amount is not always practical where small devices are concerned.

However, where two antennas which have different radiation patterns are used, and which are each used to receive statistically independent signals, antennas can be placed closer together than 0.38λ without a substantial increase in correlation between signals received by the transmitter and signals received by reradiation from adjacent antennas. Thus, referring to FIG. 2, the receive antennas 24 and 25 may be positioned closer to each other than 0.38λ at their nearest points at the centre frequency of the received signal. Preferably, in a system operating at a centre frequency of 2.65 GHz, the receive antennas 24 and 25 are positioned less than 2 cm from each other at their nearest points. This enables the overall size of the device to be reduced.

Figure 9:
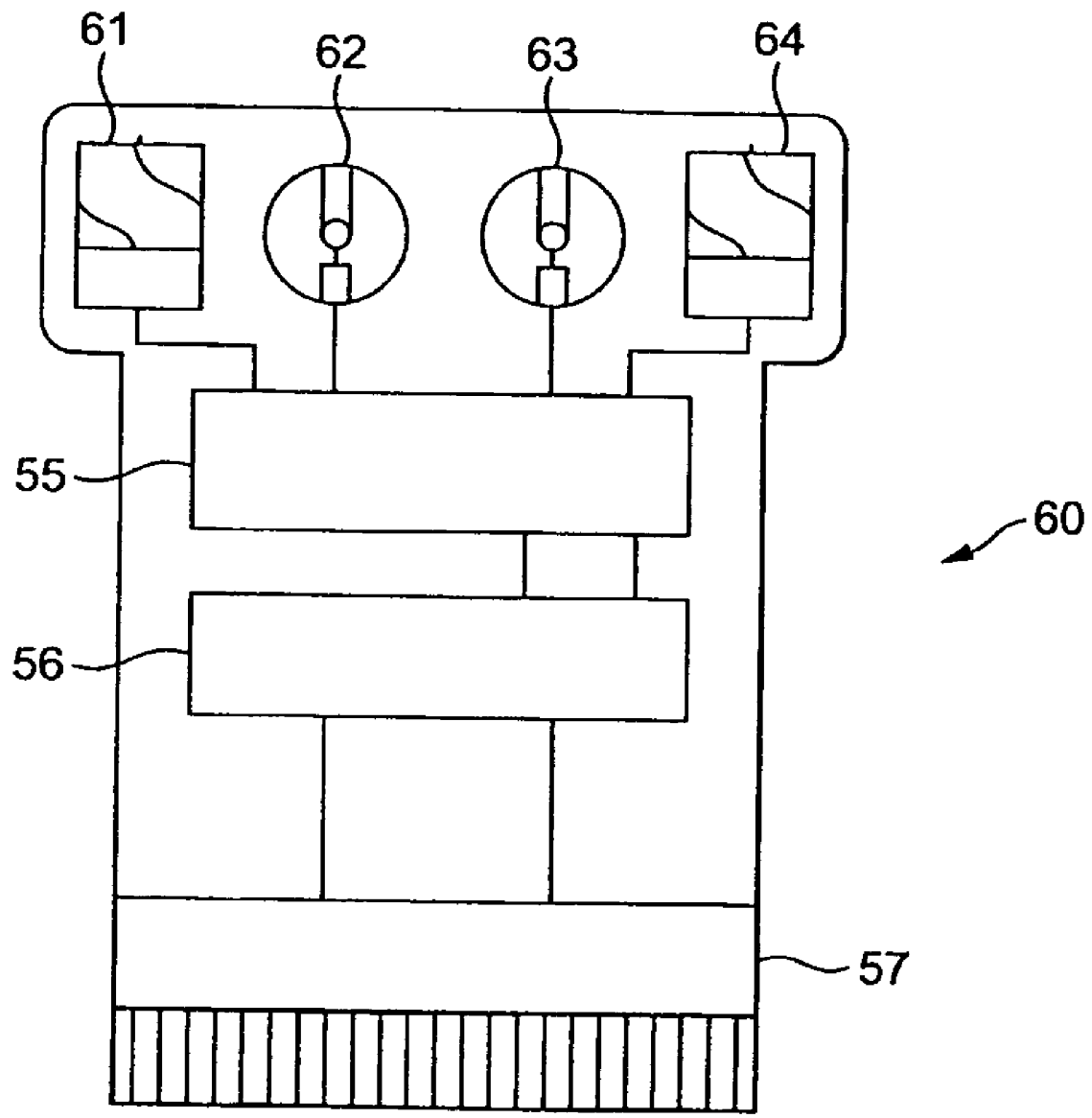
FIG. 9 is a diagram of an alternative radio communication device in accordance with the invention.

Referring to FIG. 9, an alternative radio communication device 60 in accordance with the present invention in the form of a PCMCIA (Personal Computer Memory Card International Association) device, suitable for connection to a personal computer or the like. The device includes four antennas, 61, 62, 63 and 64. Two of the antennas, 61 and 63 are receive antennas and the other two antennas, 62 and 64 are transmit antennas. The antennas are coupled to transmitter/receiver 65 which is coupled to signal processor 66. The signal processor 66 is coupled to a PCMCIA interface 67. The antennas are all dielectric loaded antennas, as described above in relation to FIG. 3. The radio communication device 60 is suitable for MIMO communication for received signals and for transmitted signals, because it includes two antennas for each.

The orientation of receive antennas 61 and 63 in the device 60 and with respect to each other is the same as in the first radio communication device described above with reference to FIG. 5. The same is also true for transmit antennas 62 and 64.

The invention claimed is:

1. A radio communication receiver device for operation at one or more frequencies in excess of 200 MHz for receiving a plurality of signals containing orthogonally coded data sub-streams derived from a source data stream, wherein the device comprises an antenna array having at least two antennas to provide antenna diversity, and, coupled to the antenna array, receiver circuitry having a detection stage arranged to detect the data sub-streams and a combiner stage for combining the detected data sub-streams to recover the source data stream, and wherein each of the antennas comprises: an electrically insulative core of solid material having a relative dielectric constant greater than 5, and a three-dimensional antenna element structure disposed on or adjacent the outer surface of the core and defining an interior volume, the material of the core occupying the major part of the said interior volume.

2. A device according to claim 1, wherein the detection stage includes a compensating network configured largely to cancel correlation existing between signals fed to the detection stage from the antenna array caused by interaction between the antennas of the array.

3. A device according to claim 2, wherein the compensating network is configured such that the S-parameters of the circuit downstream of the antennas are equal to the complex conjugate transpose of the S-parameters of the antennas array.

4. A device according to any one of claim 1, 2 or 3, wherein each of the said antennas is configured such that, at a common operating frequency of the antennas, each antenna has at least one first maximum in its radiation pattern, for waves polarised along a first axis and has at least one second maximum in its radiation pattern for waves polarised along a second axis.

5. A device according to claim 4, wherein the said first maximum lies substantially in a first plane and the said second maximum lies substantially in a second plane which is different from the first plane.

6. A device according to claim 5, wherein the first plane is orthogonal to the second plane.

7. A device according to claim 6, wherein each of the said antennas is oriented within the device such that its associated first plane is orthogonal to the first plane of an adjacent said antenna.

8. A device according to any of claims 5 to 7, wherein the first axis is the horizontal axis and the second axis is the vertical axis.

9. A device according to any one of claims 1-3 or claims 5-7, wherein each of the antennas is configured such that, at a common operating frequency of the antennas with respect to a signal received at that frequency, each antenna has a null in its radiation pattern, and wherein at least one of the antennas is oriented such that the respective null is directed towards another of the antennas.

10. A device according to claim 9, wherein all of the antennas are oriented such that a null in the radiation pattern of each antenna is directed towards another of the antennas.

11. A device according to any one of claims 1-3 or claims 5 to 7, wherein the operating frequency of the antennas is 2.65 GHz, 3.5 GHz or 5 GHz.

12. A device according to any one of claims 1 to 3 or claims 5 to 7, wherein the antenna each have a central axis and the central axes of adjacent antennas that have differently oriented radiation patterns are spaced apart by a distance of less than 0.38λ, where λ is the wavelength in air of received waves at an operating frequency.

13. A device according to claim 12, wherein the array contains at least two antennas having radiation patterns of the same orientation, the axis of each of such antennas being spaced from the axis of the nearest other such antenna by a distance of at least 0.38=, and wherein adjacent antennas having differently oriented radiation patterns have their axes spaced apart by less than 0.19λ.

14. A device according to any one of claims 1 to 3 or claims 5 to 7, wherein each of the antennas has radiating elements that are isolated from a ground plane of the device.

15. A device according to any one of claims 1 to 3 or claims 5 to 7, wherein each antenna of the array has a balanced feed connection.

16. A device according to any one of claims 1 to 3 or claims 5 to 7, wherein each antenna of the array has an associated balun.

17. A device according to claim 16, wherein the balun is an integrally formed part of the antenna.

18. A device according to any one of claims 1 to 3 or claims 5 to 7, wherein the core of each of the antennas defines a central axis, wherein the antenna element structure comprises at least two antenna elements each being substantially co-extensive in the axial direction with each element extending between axially spaced-apart positions on or adjacent the outer surface of the core, and wherein the antenna element structure further comprises a link conductor linking the said antenna element portions at one of the spaced-apart positions to form a loop, the antenna element portions at the other of the spaced-apart positions being coupled to the feed connection.

19. A device according to claim 18, wherein the core of each of the antennas is cylindrical.

20. A device according to claim 18, wherein the respective spaced-apart portions of the antenna elements lie substantially in a single plane containing the central axis of the core.

21. A device according to claim 20, wherein the antenna elements of each of the antennas are of equal length and are helical, each executing a half-turn around the core between the said spaced-apart positions.

22. A device according to any one of claims 1 to 3 or claims 5 to 7, wherein the antennas each include an integral trap arranged to promote a substantially balanced condition at a feed connection of the antenna and to isolate the antenna element structure from a ground plane of the device.

23. A device according to claim 22, wherein each of the antennas includes a central bore and a feeder structure mounted in the bore, the feeder structure being coupled to the said antenna elements at a distal end of the core.

24. A device according to claim 23, wherein the link conductor of each of the antennas comprises a cylindrical conductive sleeve on a proximal part of the outer surface of the core, and wherein the proximal end of the sleeve is connected to an outer screen part of the feeder structure.

25. A device according to any one of claims 1 to 3 or claims 5 to 7, further comprising a connector and an interface, together suitable for interfacing the device with a computer.

26. A device according to claim 25, wherein the device is a Universal Serial Bus device and the interface is a Universal Serial Bus interface.

27. A device according to claim 25, wherein the device is a PCMCIA card and the interface is a PCMCIA interface.

28. A device according to any one of claims 1 to 3 or claims 5 to 7, wherein the detection stage detects differently coded sub-streams that are coded to be statistically independent.

29. A device according to claim 28, wherein the said device is a MIMO communication device.

30. A device according to claim 28, wherein the detection stage detects data sub-streams which have been modulated using orthogonal frequency division multiplexing.

31. A device according to claim 30, wherein the detection stage detects data sub-streams which have been modulated using orthogonal spreading codes.

32. A device according to any one of claims 1 to 3 or claims 5 to 7, further comprising a transmitter coupled to the antenna array, and wherein said at least two antennas are each connected for data stream transmission.

33. A device according to any one of claims 1 to 3 or claims 5 to 7, further comprising a transmitter coupled to the antenna array, and wherein the antenna array includes two antennas connected for transmission of data streams and two antennas connected for reception of signals.

34. A radio communication device for use at frequencies greater than 200 MHz in multi-channel radio communication networks, the device comprising at least two transmit antennas and a signal processor arranged to split a single data stream into a set of data sub-streams corresponding to the number of antennas, and an encoding stage arranged for feeding each data sub-stream as a coded signal to a respective one of the antennas, the set of data sub-streams being orthogonally coded, wherein each of the transmit antennas comprises: an electrically insulative core of solid material having a relative dielectric constant greater than 5, and a three-dimensional antenna element structure disposed on or adjacent the outer surface of the core and defining an interior volume, the material of the core occupying the major part of the said interior volume.

35. A multi-channel radio communication system, comprising a plurality of radio communication devices configured to communicate with each other, wherein each device has at least two antennas arranged for either reception or transmission of signals and each of the at least two antennas has an electrically insulative core of solid material having a relative dielectric constant greater than 5, and a three-dimensional antenna element structure disposed on or adjacent the outer surface of the core and defining an interior volume, the material of the core occupying the major part of the said interior volume.

36. A system according to claim 35, being a MIMO communication system.

* * * * *

UNITED STATES PATENT AND TRADEMARK OFFICE
CERTIFICATE OF CORRECTION

| | | |
|---|---|---|
| PATENT NO. | : 8,022,891 B2 | Page 1 of 1 |
| APPLICATION NO. | : 12/002298 | |
| DATED | : September 20, 2011 | |
| INVENTOR(S) | : Oliver Paul Leisten | |

It is certified that error appears in the above-identified patent and that said Letters Patent is hereby corrected as shown below:

In column 12, at line 65, replace "=" with "$\lambda$".

Signed and Sealed this
Twenty-second Day of November, 2011

David J. Kappos
*Director of the United States Patent and Trademark Office*